United States Patent [19]

Cho

[11] Patent Number: 5,526,080
[45] Date of Patent: Jun. 11, 1996

[54] CAMERA

[75] Inventor: Michio Cho, Saitama, Japan

[73] Assignee: Fuji Photo Film Co., Ltd., Kanagawa, Japan

[21] Appl. No.: 264,919

[22] Filed: Jun. 24, 1994

[30] Foreign Application Priority Data

Jun. 28, 1993 [JP] Japan .................................. 5-157044

[51] Int. Cl.⁶ .......................... G03B 13/10; G03B 17/24; G03B 37/00
[52] U.S. Cl. ............................ 354/159; 354/106; 354/222
[58] Field of Search .................................... 354/105, 106, 354/159, 199, 222, 94

[56] References Cited

U.S. PATENT DOCUMENTS

| | | | |
|---|---|---|---|
| 5,255,030 | 10/1993 | Mukai et al. | 354/94 |
| 5,345,285 | 9/1994 | Hasushita et al. | 354/159 |
| 5,389,991 | 2/1995 | Naka et al. | 354/159 |
| 5,410,381 | 4/1995 | Kameyama et al. | 354/222 |

*Primary Examiner*—A. A. Mathews
*Attorney, Agent, or Firm*—Young & Thompson

[57] ABSTRACT

A camera may be set in either a standard photograph mode or a panoramic mode. In the standard photograph mode, the field of view of a viewfinder is masked on opposite horizontal sides, and the magnification of a taking lens is set at a value at which a photographic field corresponding to the masked field of view is taken in a standard-size frame. In the panoramic mode, the field of view is unmasked while the magnification of the viewfinder is maintained unchanged, and the magnificaiton of the taking lens is set at another value at which a photographic field corresponding to the unmasked field of view is taken in a panoramic-size area which is reduced in height from the standard-size frame and is used for making a panoramic-size photo-print.

14 Claims, 5 Drawing Sheets

CAMERA

BACKGROUND OF THE INVENTION

1. Field of the Invention

The present invention relates to a camera which has a function for designating a print aspect ratio of a photo-print concurrently with photographing, and more particularly to a camera wherein a field of view of a viewfinder is changed to have the same aspect ratio as an effective picture area to be used for printing, while maintaining the vertical range of the field of view as well as that of a photographic field taken within the effective picture area substantially unchanged before and after changing the print aspect ratio.

2. Related Art

Some of recent 35 mm compact cameras for taking pictures in full-size on 35 mm photographic film, have a function for designating a print aspect ratio of a photo-print concurrently with photographing so as to change the print aspect ratio within the same photographic film.

There are two types of aspect ratio changing or selecting methods, namely, using a variable exposure opening type and using a fixed exposure opening type. In the variable exposure opening type, that is utilized, for example, in "Kardia Travel Mini" (a trademark) sold under the name of Fuji Photo Film Co., Ltd., a mechanical mask member or an LCD panel mask member is disposed in front of an exposure aperture of a camera, for actually changing the original frame size in accordance with the print aspect ratio. For example, a panoramic-size exposure frame of 13 mm×36 mm (aspect ratio: about 2.8) is provided by masking upper and lower portions of the exposure aperture which defines a 35 mm format full-size exposure frame of 24 mm×36 mm (aspect ratio: 1.5). An original taken in the panoramic-size exposure frame is printed at a magnification of about twice the magnification for a standard printing, so as to produce a panoramic print which is twice as long as a standard print.

in the fixed opening type, every original is taken in a full-size defined by a fixed exposure aperture, and an area of the original that corresponds to the print aspect ratio is printed by cropping. In this type, data of print aspect ratio or the area to be printed with the full-size frame is optically or magnetically recorded in association with the original to be cropped. Therefore, we use the phrase "an effective picture area" for the area to be printed within the full-size frame, and the phrase "a vertical angle of view" for an angle of view that is determined based on the height of the effective picture area and the focal length, and the phrase "a vertical range of photographic field" for the scenic range included in the effective picture area in the direction of height.

It is conventional in these types of cameras to display a frame in a field of view of a viewfinder, for indicating a photographic field corresponding to the effective picture area. For example, in "IZM 220 Panorama Zoom" (a trademark), when a panoramic photograph mode is selected, upper and lower portion of a field of view of the viewfinder are masked in black, while the field of view is a little widened in a horizontal direction, concurrently with the changing of the exposure frame into a panoramic size, which is effected by inserting a movable masking plates into the upper and lower portions of the exposure aperture.

Although the above-described conventional camera can perform a panoramic photography at any image magnification, the panoramic photography is merely to mask the upper and lower portion of the full-size exposure aperture or to crop the full-size original. Therefore, the panoramic-size photo-prints made from those originals do not actually cover a wider angle of view or a wider horizontal range than the standard-size photo-print made from the full-size original, and do not look so much like panoramic. Moreover, because the vertical range of the field of view is reduced for indicating the panoramic photographic field, it is inevitable to give an impression to the photographer that the field of view is rather confined than widened, even through the horizontal range of the field of view is a little enlarged. It certainly reduces the pleasure of taking panoramic photographs.

SUMMARY OF THE INVENTION

In view of the foregoing, a primary object of the present invention is to provide a camera having a function for designating a print aspect ratio of a photo-print, wherein a field of view of a viewfinder is widen to be worthy of a "panoramic" view in a panoramic photograph mode, and the focal length of a taking lens is changed to cover a wider angle of photographic field in correspondence with the field of view of the viewfinder in the panoramic photograph mode.

To achieve the above and other objects, the present invention provide a finder masking device for masking horizontal sides of a field of view of a viewfinder in a standard photograph mode, so as to set the field of view at the same aspect ratio as that of a standard-size photo-print. The viewfinder has a fixed magnification, and the unmasked field of view has the same aspect ratio as that of a special-size photo-print, preferably, a panoramic-size photo-print. The present invention also provides a magnification changing device for changing the magnification of a taking lens. In the standard photograph mode, the magnification is set at a first value at which a photographic field taken in an effective picture area corresponds to the masked field of view having the standard-size aspect ratio. In a special photograph mode, the magnification is set at a second value at which a photographic field taken in an effective picture area corresponds to the unmasked field of view having the special-size aspect ratio, while maintaining a vertical range of the photographic field unchanged from the standard photograph mode.

According to an embodiment of the invention, an aperture masking device is provided for masking upper and lower portion of a standard-size frame, which corresponds to the standard-size photo-print, in a special photograph mode, so as to provide a special-size frame corresponding to the special-size photo-print. In this embodiment, the standard-size frame and the special-size frame define the effective picture areas in the respective modes.

Because the field of view of the viewfinder is widened in the special photograph mode, while maintaining the vertical range of the field unchanged, the photographer would have enough of the special photography especially when the special photograph mode is a panoramic photograph mode. Simultaneously, the magnification of the taking lens is changed to cover the wide-angle photographic field corresponding to the field of view of the viewfinder in the special photograph mode. Therefore, the consequent photo-print contains a wide-angle scene.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
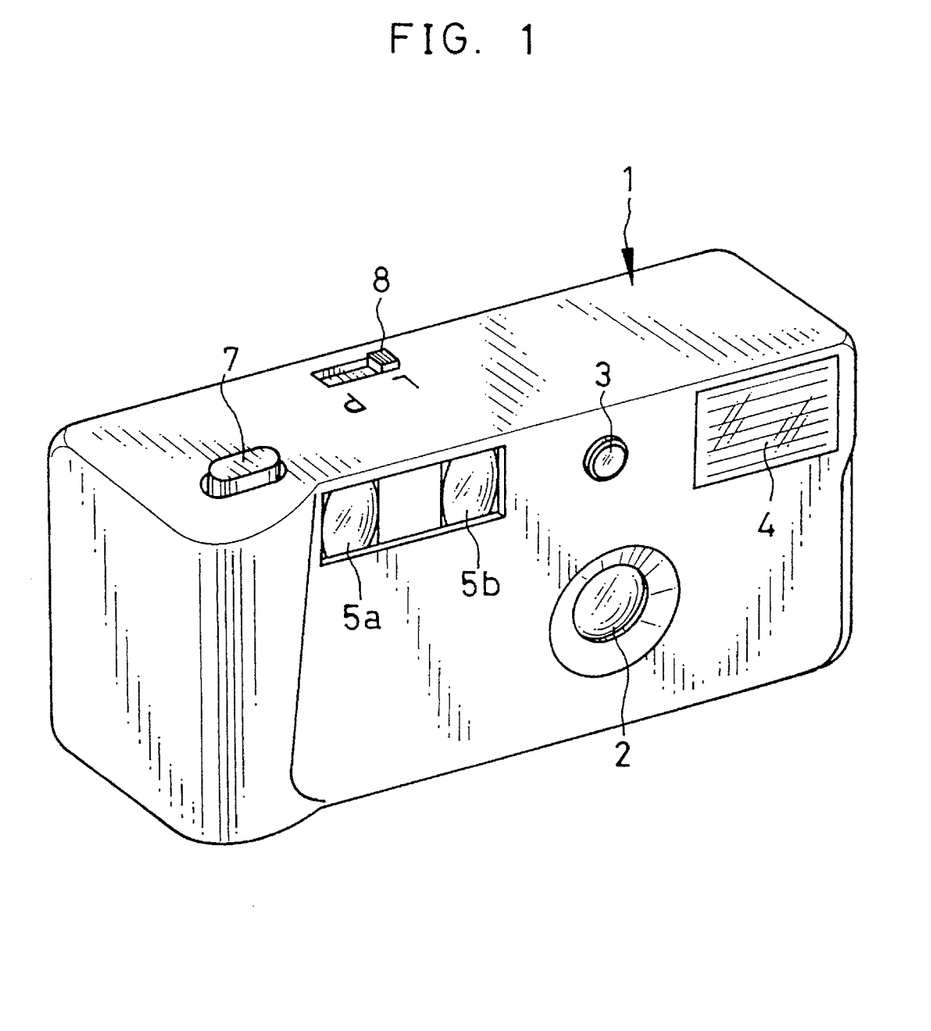
FIG. 1 is a perspective view of a camera according to a preferred embodiment of the invention.

Referring to FIG. 1, a camera 1 has a taking lens 2, a finder objective lens 3, a flash window 4, and light projecting and receiving windows 5a and 5b for use in range finding disposed on a front side thereof. A release button 7 and a mode changing knob 8 are disposed on a top side of the camera 1. The camera 1 is set in a standard photograph mode by switching the mode changing knob 8 to a terminal position indicated by "L". By switching the mode changing knob 8 to another terminal position indicated by "P", the camera 1 is set in a panoramic photograph mode.

Figure 2:
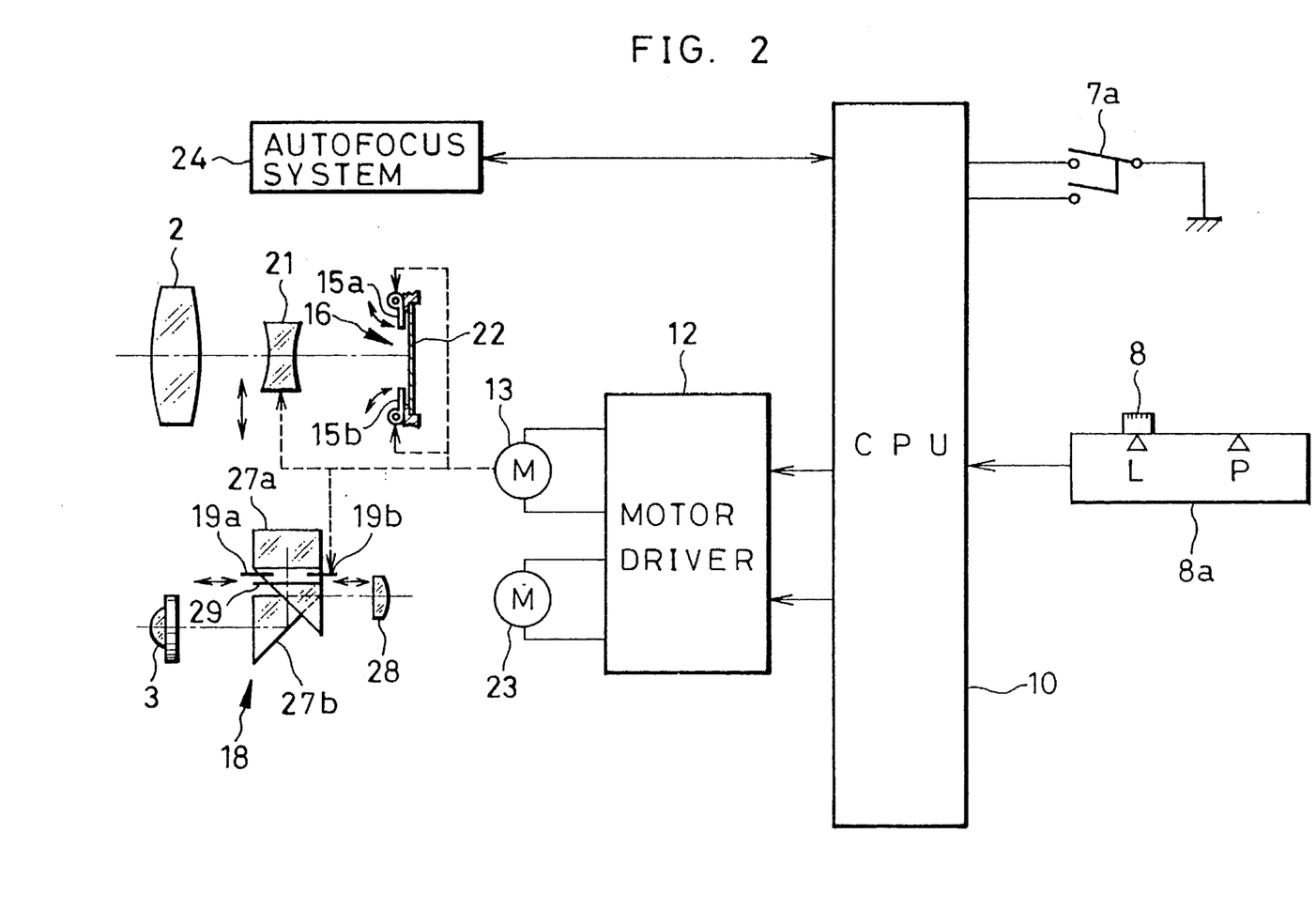
FIG. 2 is a diagram illustrating the overall construction of the camera shown in FIG. 1.

As shown in FIG. 2, the camera 1 operates under the control of a CPU 10, to which operation signals indicative of a half-depression or a full-depression of the release button 7 are applied through a pair of a release switch 7a. The operation of the mode changing knob 8 is inputted through a switch 8a to the CPU 10, whereupon a motor 13 is driven through a motor driver 12 so as to move a pair of opaque aperture masking plates 15a and 15b into or out of an exposure aperture 16 in accordance with the photograph mode selected by the mode changing knob 8. Although the aperture masking plates 15a and 15b are mounted pivotal in the present embodiment, it is possible to mount a pair of aperture masking plates which are slidable in opposite vertical directions. A pair of finder masking plates 19a and 19b are also moved by the motor 13 into or out of a field of view of an optical viewfinder 18 in a manner as set forth below.

The motor 13 also moves a converter or conversion lens 21 into or out of an exposure light path of the taking lens 2 so as to change the focal length and thus the magnification of the taking lens 2, in cooperation with the aperture masking plates 15a and 15b.

A motor 23 is provided for transporting a photographic film 22 such that the film 22 is advanced one-frame amount after each exposure, and that the photographic film 22 is rewound after the exposure of all available frames is complete. An autofocus system 24 is activated when the shutter button 7 is depressed halfway, to project light through the light projection window 5a and output a range finding signal to the CPU 10, which is detected based on the light reflected by a subject and received through the light receiving window 5b.

Figure 3:
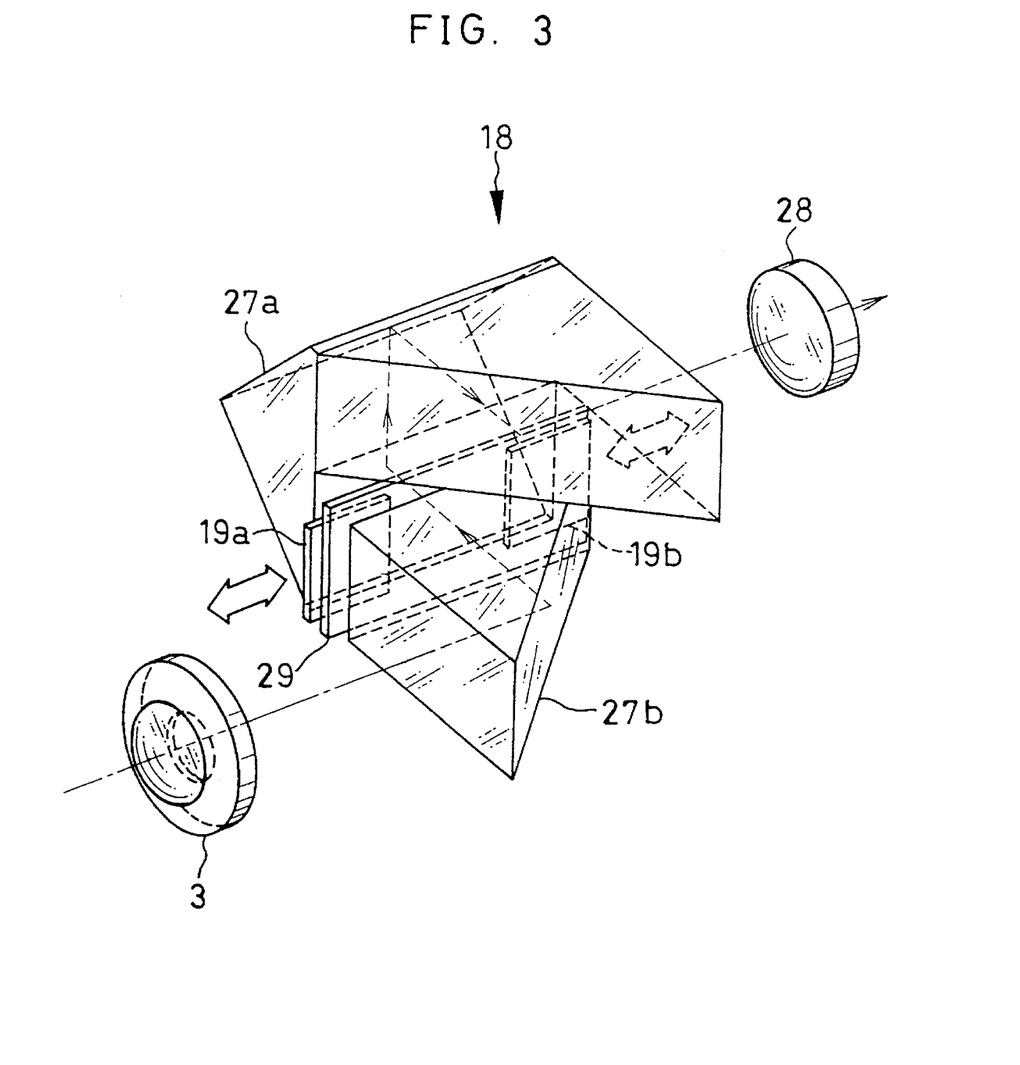
FIG. 3 is an explanatory view illustrating an optical viewfinder of the camera shown in FIG. 2.

The optical viewfinder 18 is a Keplerian viewfinder as shown in FIG. 3, which is comprised by the objective lens 3, a Porro prism 27, and an eyepiece 28. An inverted real image formed through the objective lens 3 is converted into an erect image, and the erect image is enlarged through the eyepiece 28. The Porro prism 27 has a primary prism 27a and a subsidiary prism 27b. A transparent film 29 having a target mark (not-shown) printed thereon is disposed between the primary prism 27a and the subsidiary prism 27b, and cemented onto a real image surface of the subsidiary prism 27b. The finder masking plates 19a and 19b, which are made of an opaque material, are mounted on opposite horizontal sides of the transparent film 29 movable in the horizontal direction into and out of a finder optical path.

Figure 4A:
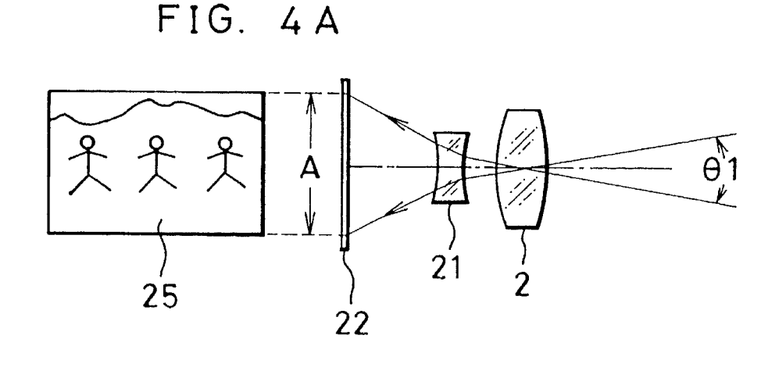
FIG. 4A is an explanatory view illustrating a standard size picture frame taken in a standard photograph mode.
Figure 4B:
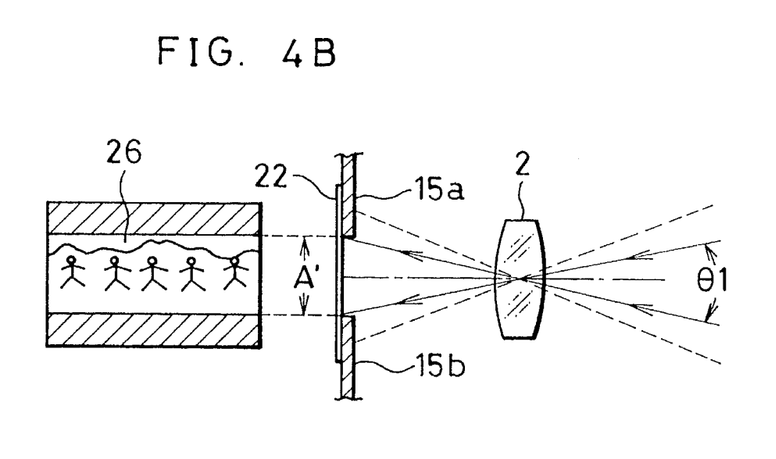
FIG. 4B is an explanatory view illustrating a panoramic size picture frame taken in a panoramic photograph mode.

In the standard photograph mode, the aperture masking plates 15a and 15b are retracted from the exposure light path, as shown in FIG. 4A, so that a standard exposure frame 25 having an aspect ratio of 1.5 is defined by the exposure aperture 16, which corresponds to a full-size frame (24 mm×36 mm) taken on ISO 135-type film having a width 35 mm. In the panoramic photograph mode, the aperture masking plates 15a and 15b are inserted in the exposure light path, as shown in FIG. 4B, and a panoramic-size frame 26 having an aspect ratio of about 2.8 (13 mm×36 mm) is provided. In FIG. 4B, hatched portions indicate the portion masked by the aperture masking plates 15a and 15b, so that the panoramic-size frame 26 excludes the hatched portions.

Simultaneously with the change of the frame size, the focal length of the taking lens 2 is changed by using the converter 21, so as to maintain the vertical angle of view θ1 constant between the standard photograph mode and the panoramic photograph mode. For example, the composed focal length of the taking lens 2 and the converter 21, which is used in the standard photograph mode, is 45 mm, whereas the focal length of the taking lens 2 alone, which is used in the panoramic photograph mode, is 25 mm. As a result of the change in focal length, the image magnification is changed correspondingly. Thereby, the photographic field taken within the panoramic-size frame 26 covers the approximately same vertical range as that taken within the full-size frame 25, in spite of the less height A' of the panoramic-size frame 26 than the height A of the full-size frame 25. On the contrary, the panoramic photographic field taken within the panoramic-size frame 26 covers a wider horizontal range than the standard photographic field.

Figure 5A:
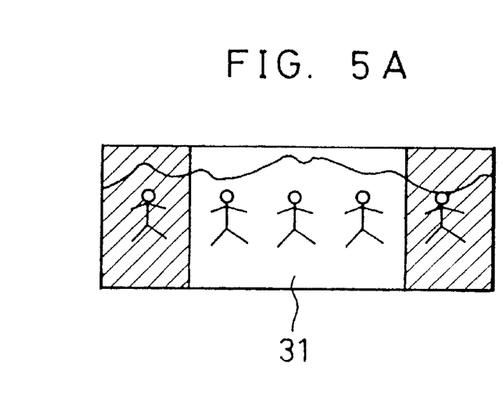
FIG. 5A is an explanatory view illustrating a field of view in the standard photograph mode.
Figure 5B:
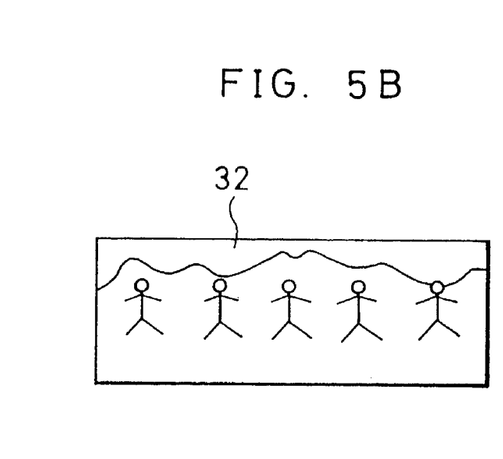
FIG. 5B is an explanatory view illustrating a field of view in the panoramic photograph mode.

Regarding the viewfinder 18, a standard field of view 31 having the same aspect ratio and covering the same photographic field as the full-size frame 25 is provided in the standard photograph mode by inserting the finder masking plates 19a and 19b into the finder optical path, as shown in FIG. 5A. In the panoramic photograph mode, the finder masking plates 19a and 19b are retracted from the finder optical path while maintaining the magnification of the viewfinder 18 constant, as shown in FIG. 5B. Thereby, a panoramic field of view 32 is provided in correspondence with the panoramic-size frame 26, covering the wider horizontal range, without reducing the vertical length and the magnification compared with the standard field of view 31.

The operation of the above-described camera is as follows:

When the mode changing knob 8 is set in the position indicated by "L", the camera 10 is set in the standard photograph mode, wherein the aperture masking plates 15a and 15b are retracted from the exposure light path to provide the full-size frame 25. Simultaneously, the converter 24 is inserted behind the taking lens 2 to provide the composed focal length of 45 mm. Also the finder masking plates 19a and 19b are inserted in the finder optical path to provide the standard field of view 31 which corresponds to the full-size frame 25.

When the mode changing knob 8 is set in the position indicated by "P", the camera 10 is set in the panoramic photograph mode, wherein the aperture masking plates 15a and 15b are inserted into the exposure light path to provide the panoramic-size frame 26. Simultaneously, the converter 21 is removed from the exposure light path to provide the focal length of 25 mm, and the finder masking plates 19a and 19b are retracted from the finder optical path to provide the panoramic field of view 32 which looks remarkably wider than the standard field of view 31.

After selecting a desirable one of the photograph modes, the photographer frames a subject through the viewfinder 18, and depresses the release button 7. Upon a half-depression of the release button 7, the autofocus system 24 is activated to focus the taking lens 2 onto the subject. And an exposure is effected upon a full-depression of the release button 7.

When making a panoramic photo-print from an original taken in the panoramic-size frame 26, a magnification is used which is about twice as large as that used for making a standard size photo-print from an original taken in the full-size frame 25.

Figure 6:
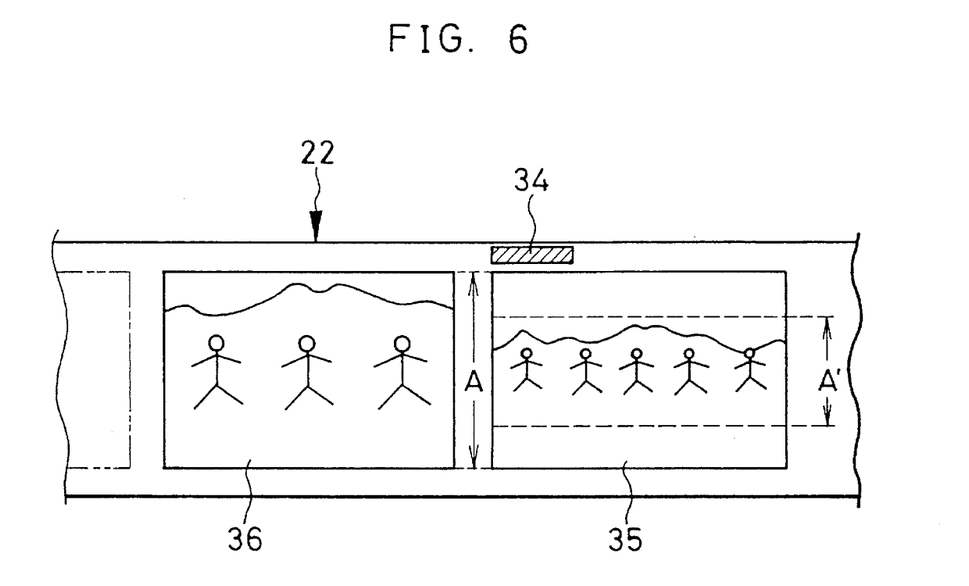
FIG. 6 is an explanatory view illustrating picture frames taken in a standard photograph mode and a panoramic photograph mode, according to another embodiment of the present invention.

While the embodiment has been described with respect to the camera wherein the size of the exposure aperture is actually changed by using the opaque masking plates 15a and 15b, it is possible to take all pictures in full-size without using any masking plate, as is shown in FIG. 6, while recording mode data 34 in association with an original 35 to be cropped in printing, for designating the effective picture area to be printed in correspondence with the selected photograph mode. Mode data for designating the effective picture area may also be recorded in association with an original 36 to be entirely printed in standard size. The mode data may be optically recorded on a peripheral portion outside the original by using an LED or the like, or may be magnetically recorded by using a magnetic head in case of a photographic film being provided with a magnetic recording layer.

The opaque finder masking plates 19a and 19b may be replaced by an LCD panel which may be set opaque or transparent in opposite horizontal sides of the field of view of the viewfinder. Also the frame size may be defined by using an LCD panel. It is, of course, possible to use a single movable mask for masking the field of view or the exposure aperture.

Although the camera 10 as described so far is changeable between the standard photograph mode and the panoramic photograph mode, it is possible to make the camera changeable among the standard photograph mode, the panoramic photograph mode and a wide-size photograph mode for taking a picture frame having such an aspect ratio which is more than the full-size aspect ratio but less than the panoramic-size aspect ratio. For example, the wide-size frame is 21 mm high and 36 mm long, and the focal length for the wide-size photograph mode is set to 39.5 mm, so as to maintain the vertical angle of view approximately constant between these three photograph modes. Thereby, the vertical range of the photographic field contained in a finished photo-print is unchanged between the different photograph modes as for the same subject.

It may be preferable to optically record an index for distinguishing between the panoramic-size and the wide-size onto a portion of the picture frame which is masked out by an aperture masking plate. It is, of course, possible to make the camera changeable between the standard photograph mode and the wide-size photograph mode.

Although the standard photograph mode has been described as a mode for taking the full-size frame of 35 mm film, the standard photograph mode may be a mode for taking a high vision size frame of 15 mm×26.7 mm, if the present invention is applied to a camera for a film having a width of 26 mm.

Although the camera 10 as described above is fixedly set at the focal length of 45 mm for the full-size frame, the present invention is applicable to a camera having a telephoto mode using a focal length of 70 mm, for instance. In that case, the photograph mode may be changeable between the telephoto (F=70 mm) and wide-angle (F=45 mm) and panoramic (F=25 mm) modes. The magnification of the viewfinder should be changed correspondingly between the telephoto and wide-angle modes, but unchanged between the wide-angle and panoramic modes. Only the horizontal range of the field of view is elongated in the same way as described above.

The present invention may be applicable to a zoom camera having a zoom taking lens and a zoom finder. In that case, zooming of the taking lens may be effected while maintaining the exposure frame in a standard size in a range from a telephoto to a wide-angle position, and the viewfinder is zoomed correspondingly. And when the zoom camera is switched to a panoramic photograph mode, the exposure frame is changed to a panoramic-size, and the focal length of the taking lens is changed to a panoramic value, e.g., 25 mm by zooming. On the other hand, the magnification of the viewfinder is maintained unchanged, while the field of view is changed to a panoramic size having a side long aspect ratio.

While the present invention has been described in detail with respect to the preferred embodiments shown in the drawings, the present invention should not be limited to the embodiments, but on the contrary, various modifications may be possible without departing from the scope of the appended claims.

What is claimed is:

1. In a camera which may be set in either of two photograph modes, one being a standard photograph mode for taking a picture in a standard-size frame on a photographic film, the other being a panoramic photograph mode for taking a picture in a panoramic-size frame which has a different aspect ratio from that of the standard-size frame and is formed by reducing the height of the standard-size frame on opposite vertical sides thereof, the improvement comprising:

a viewfinder having a fixed magnification, whose field of view has a first aspect ratio which is approximately equal to the aspect ratio of the panoramic-size frame;

a finder field changing device which may restrict the field of view of the viewfinder on opposite horizontal sides thereof so as to change the field of view from the first aspect ratio to a second aspect ratio which is equal to the aspect ratio of the standard-size frame;

a taking lens whose magnification is changeable between a standard value and a panoramic value, such that a vertical range of the field of view corresponds to a vertical range of a picture to be taken within the standard-size frame at the standard value of the magnification, and that a vertical range of the field of view corresponds to a vertical range of a picture to be taken within the panoramic-size frame at the panoramic value of the magnification; and a mode changing switch for selecting either of the standard and panoramic photograph mode, wherein the field of view is set to the second aspect ratio by the finder field changing device and, the magnification of the taking lens is set to the standard value in the standard photograph mode, whereas, when the panoramic photograph mode is selected, the field of view is returned to the first aspect ratio, and the magnification of the taking lens is set to the panoramic value.

2. In a camera which may be set in one of three photograph modes, a first mode being a standard photograph mode for taking a picture in a standard-size frame on a photographic film, a second being a panoramic photograph mode for taking a picture in a panoramic-size frame which has a first aspect ratio different from a second aspect ratio of the standard-size frame and is formed by reducing the height of the standard-size frame on opposite vertical sides thereof, and a third mode for taking a picture in a third-size frame which has a third aspect ratio of a value between the first and second aspect ratio, the improvement comprising:

a viewfinder having a fixed magnification, whose field of view has the same first aspect ratio as the panoramic-size frame;

a finder field changing device which may restrict the field of view of the viewfinder on opposite horizontal sides thereof so as to change the field of view from the first aspect ratio to the second or the third aspect ratio; and a taking lens whose magnification is changeable between a standard value, a panoramic value and a third value, such that a vertical range of the field of view corresponds to a vertical range of a picture to be taken within the standard-size frame at the standard value of the magnification, that a vertical range of the field of view corresponds to a vertical range of a picture to be taken within the panoramic-size frame at the panoramic value of the magnification, and that a vertical range of the field of view corresponds to a vertical range of a picture to be taken within the third-size frame at the third value of the magnification; wherein when the standard photograph mode is selected, the field of view is set to the second aspect ratio by the finder field changing device and, the magnification of the taking lens is set to the standard value, and when the panoramic photograph mode is selected, the field of view is returned to the first aspect ratio, and the magnification of the taking lens is set to the panoramic value, and when the third photograph mode is selected, the field of view is set to the third aspect ratio by the finder field changing device, and the magnification of the taking lens is set to the third value.

3. In a camera which takes pictures in a constant size on a photographic film, and has a device for assigning either a standard print or a cropping print to each picture, the standard print printing the entire area of the picture as an effective picture area, the cropping print printing a cropped area of the picture as an effective picture area, and a device for recording distinguishing data on the photographic film to distinguish between the pictures for the cropping print and the pictures for the standard print, the improvement wherein:

the cropped area is provided by cropping upper and lower portions of the picture to have a first aspect ratio different from a second aspect ratio of the constant size;

a viewfinder has a fixed magnification and a field of view of the first aspect ratio;

a finder field changing device may restrict the field of view of the viewfinder on opposite horizontal sides thereof so as to change the field of view from the first aspect ratio to the second aspect ratio when the standard print is assigned; and the magnification of a taking lens is changeable between a standard value and a special value, such that when the standard print is assigned, the magnification is set at the standard value at which a vertical range of the field of view corresponds to a vertical range of the entire area of the picture, and that when the cropping print is assigned, the magnification is set at the special value at which the vertical range of the field of view corresponds to a vertical range of the cropped area of the picture.

4. In a camera having a mode changing switch for setting either a standard photograph mode or a special photograph mode, the standard photograph mode being directed to make a standard-size photo-print from a standard-size frame at the same aspect ratio, the special photograph mode being directed to make a special-size photo-print from a picture area which is reduced in height from the standard-size frame, so that the special-size photo-print has a different aspect ratio from the standard-size frame, the improvement comprising:

a viewfinder having a fixed magnification, whose field of view having a first aspect ratio which is equal to that of the special-size photo-print;

a finder masking device for masking horizontal sides of a field of view of a viewfinder in the standard photograph mode, so as to change the field of view from the first aspect ratio to a second aspect ratio which is equal to that of the standard-size photo-print;

a magnification changing device for changing the magnification of a taking lens such that the magnification is set at a first value in the standard photograph mode, at which a standard photographic field corresponding to the masked field of view is taken in the standard-size frame, whereas the magnification is set at a second value in the special photograph mode, at which a special photographic field corresponding to the unmasked field of view is taken in the picture area to be printed, while maintaining a vertical range of the special photographic field unchanged from the standard photographic field.

5. A camera as claimed in claim 4, wherein the standard-size frame is a full-size frame of 35 mm photographic film.

6. A camera as claimed in claim 5, wherein the special-size photo-print is a panoramic-size photo-print.

7. A camera as claimed in claim 4, further comprising an aperture masking device for masking upper and lower portion of the standard-size frame in the special photograph mode, so as to define the picture area to be printed for making the special-size photo-print.

8. A camera as claimed in claim 7, wherein the aperture masking device comprises a mask member which is mounted movable in front of an exposure aperture of the camera which defines the standard-size frame.

9. A camera as claimed in claim 4, wherein the finder masking device comprises a mask member which is mounted to be slidably insertable into an optical path of the viewfinder.

10. A camera as claimed in claim 9, wherein the viewfinder comprises an objective lens, an eyepiece, and a Keplerian Porro prism constituted of a primary prism and a subsidiary prism, and the mask member is insertable between the primary prism and the subsidiary prism.

11. A camera as claimed in claim 4, wherein the magnification changing device comprises a conversion lens which is mounted insertable into an optical path of the taking lens.

12. In a camera having a mode changing switch for setting either a standard photograph mode or a special photograph mode, the standard photograph mode being directed to make a standard-size photo-print from a standard-size frame at the same aspect ratio, the special photograph mode being directed to make a special-size photo-print from a picture area which is reduced in height from the standard-size frame, so that the special-size photo-print has a different aspect ratio from the standard-size frame, the improvement comprising:

a viewfinder having a fixed magnification, a field of view of the viewfinder having a first aspect ratio equal to that of the special-size photo-print;

a finder mask member mounted to be insertable into an optical path of the viewfinder, for masking horizontal sides of the field of view of the viewfinder in the standard photograph mode, so as to change the field of view from the first aspect ratio to a second aspect ratio which is equal to that of the standard-size photo-print;

a conversion lens mounted insertable into an optical path of a taking lens, for changing the magnification of the taking lens such that the magnification is set at a first value in the standard photograph mode, at which a standard photographic field corresponding to the masked field of view is taken in the standard-size frame, whereas the magnification is set at a second value in the special photograph mode, at which a special photographic field corresponding to the unmasked field of view is taken in the picture area to be printed, while maintaining a vertical range of the special photographic field unchanged from the standard photographic field.

13. A camera as claimed in claim 12, further comprising an aperture mask member mounted movable in front of an exposure aperture which defines the standard-size frame, for masking upper and lower portion of the standard-size frame in the special photograph mode, so as to define the picture area to be printed for making the special-size photo-print.

14. A camera as claimed in claim 13, wherein the aperture mask member, the finder mask member and the conversion lens are moved by a motor which is driven in accordance with a mode changing signal inputted through the mode changing switch.

* * * * *